United States Patent
Oochi et al.

(10) Patent No.: US 7,224,396 B2
(45) Date of Patent: May 29, 2007

(54) STILL IMAGE PICKUP DEVICE AND PICKUP METHOD

(75) Inventors: Yoshikazu Oochi, Chiba (JP); Masakazu Koyanagi, Chiba (JP); Kenichi Sanpei, Chiba (JP); Takahiro Koyama, Kanagawa (JP); Toshinori Orito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1453 days.

(21) Appl. No.: 10/399,620

(22) PCT Filed: Aug. 14, 2002

(86) PCT No.: PCT/JP02/08275

§ 371 (c)(1),
(2), (4) Date: Apr. 18, 2003

(87) PCT Pub. No.: WO03/017647

PCT Pub. Date: Feb. 27, 2003

(65) Prior Publication Data

US 2005/0179779 A1 Aug. 18, 2005

(30) Foreign Application Priority Data

Aug. 20, 2001 (JP) ............................ 2001-249409

(51) Int. Cl.
*H04N 5/222* (2006.01)

(52) U.S. Cl. .................. 348/345; 348/370; 348/216.1; 348/342

(58) Field of Classification Search ............... 396/106, 396/108, 98, 61; 348/370, 360, 345, 362, 348/65, 45, 216.1, 217.1, 342

See application file for complete search history.

(56) References Cited

U.S. PATENT DOCUMENTS

| 4,695,878 | A | * | 9/1987 | Levine et al. | ............ 348/216.1 |
| 5,982,423 | A | * | 11/1999 | Sekiguchi | ................ 348/216.1 |
| 6,363,220 | B1 | * | 3/2002 | Ide | ............................... 396/98 |
| 6,377,305 | B2 | * | 4/2002 | Onuki | ......................... 348/345 |

(Continued)

FOREIGN PATENT DOCUMENTS

JP           1 303410           12/1989

(Continued)

*Primary Examiner*—David Ometz
*Assistant Examiner*—Pritham D. Prabhakher
(74) *Attorney, Agent, or Firm*—Frommer Lawrence & Haug LLP; William S. Frommer; Thomas F. Presson

(57) ABSTRACT

The present invention concerns a digital still camera (1). This camera carries out a framing process by using an infrared pick-up image and a visible light photographing by using a flash or a low speed shutter in a still image pick-up process. Upon automatic focusing, the light of an auxiliary visible light source (23) for automatic focusing is emitted to apply the visible lights and carry out an automatic focusing process. In the digital still camera, the framing process can be carried out which allows the image of a subject which is to be picked up to be displayed on a finder even under an environment of low illuminance such as photographing a dark place and a user to recognize the contents of the photographed image. Further, after that, even when the visible light photographing is carried out through the irradiation of flash or the low speed shutter, an accurate focusing can be realized.

10 Claims, 4 Drawing Sheets

U.S. PATENT DOCUMENTS

| | | | |
|---|---|---|---|
| 6,714,247 B1 * | 3/2004 | Numazaki et al. | 348/370 |
| 6,781,632 B1 * | 8/2004 | Ide | 348/345 |
| 6,819,360 B1 * | 11/2004 | Ide et al. | 348/340 |
| 6,850,282 B1 * | 2/2005 | Makino et al. | 348/371 |
| 6,989,867 B2 * | 1/2006 | Kim | 348/362 |

FOREIGN PATENT DOCUMENTS

| | | |
|---|---|---|
| JP | 10-13730 | 1/1998 |
| JP | 2000 59798 | 2/2000 |
| JP | 2000-121924 | 4/2000 |
| JP | 2000-266988 | 9/2000 |
| JP | 2002-44495 | 2/2002 |
| JP | 2002-221656 | 8/2002 |

* cited by examiner

STILL IMAGE PICKUP DEVICE AND PICKUP METHOD

TECHNICAL FIELD

The present invention relates to a still image pick-up device and method for electronically picking-up a still image by using a photoelectric converter such as a CCD (Charge Coupled Device) image sensor.

BACKGROUND ART

An electronic still image pick-up device called the so-called digital still camera that employs an image sensor as a photoelectric converter has been hitherto widely used.

In such a digital still camera, as well as a camera with a usual silver salt film, a flash function or a low speed shutter function or the like are likewise provided in order to supplement for the shortage of the quantity of light under an environment of low illuminance such as at night or a dark place. The flash function is a function for emitting a flash of strong light to apply light to a subject by using a discharge tube such as a xenon lamp. Further, the low speed shutter function indicates a function for performing charge storage in the CCD for a long time.

In the digital still camera, when an image detected by the CCD is displayed on, for instance, a liquid crystal panel used as a finder, the image of the subject before it is photographed cannot be displayed on the finder under the environment of low illuminance. That is, under the environment of low illuminance, even when a still image can be photographed, a user cannot carry out a framing process to display a picked-up image on the finder so that the user may recognize the position of the subject or a composition before the user photographs the subject.

In order to solve the above-described problem, a digital still camera having an infrared photographing function that a subject is irradiated with infrared rays and a framing process is performed while an infrared cut filter is retracted from an optical path has been recently proposed.

FIG. 1 shows the wavelength sensitivity characteristics A of a CCD and the wavelength passing characteristics B of an infrared cut filter. As shown in FIG. 1, the CCD has an adequate sensitivity not only for visible lights, but also for infrared rays having the wavelength of about 700 nm or more. On the contrary, the infrared cut filter does not pass the infrared rays having the wavelength of 700 nm or more. In an ordinary photographing, since an exposure under infrared rays is prohibited, the infrared cut filter is inserted into the optical path of light for photographing an image. On the other hand, in an infrared photographing, the infrared cut filter is retracted outside the optical path, further, a subject is irradiated with infrared rays from infrared light emitting means provided in a camera main body and reflected lights thereof are photographed. Accordingly, in the digital still camera having such an infrared photographing function, the infrared photographing is carried out in framing process. Upon still image photographing, an emission of infrared rays is stopped and a visible light photographing is carried out by using a flash function or a low speed shutter function instead thereof. Thus, even under the environment of low illuminance, the position of the subject or a composition can be recognized before the subject is photographed and the subject can be put in a frame as desired by a user.

The digital still camera ordinarily has an automatic focusing function that a focalization is automatically made. The automatic focusing system of the digital still camera includes various systems. As one of them, there is a self-focus detecting system using image characteristics that a focused image has more high frequency components than those of a hardly focused image. The self-focus detecting system is a system that the high frequency components for an actually picked-up image are detected while the position of a focus lens is moved and a focal point is set to the position of the lens where the high frequency components are most located.

However, a chromatic aberration is present in the lens, and a focal distance is different between the infrared radiation and the visible radiation. Therefore, for instance, even when the image of the same subject is picked up from the same position, the focusing position of the focus lens is different between in the infrared photographing and in the visible light photographing. Accordingly, in case the infrared photographing is carried out upon framing process and the visible light photographing using the flash or the like is carried out upon photographing a still image, when the automatic focusing process is carried out in accordance with the self-focus detecting system based on a picked up image under the infrared radiation, a blooming and dim still image is photographed.

Further, even when the automatic focusing process is carried out only by natural lights with infrared rays cut, an obtained image has a very low contrast under a state of low illuminance. Therefore, it is difficult, in the first place, to detect the focusing position by using the self-focus detecting system.

As mentioned above, when the infrared photographing is carried out in the framing process and the visible light photographing by using the flash or the like is carried out in the photographing a still image, it is extremely difficult to accurately perform the automatic focusing process for detecting the focusing position of the still image.

DISCLOSURE OF THE INVENTION

It is an object of the present invention to provide a still image pick-up device and a still image pick-up method in which a framing process can be realized that an image of a subject which is to be picked up is displayed on a finder even under an environment of low illuminance such as photographing a dark place so as to allow a user to recognize the contents of a photographed image, and then, even when a visible light photographing is carried out by using the irradiation of a flash or a low speed shutter, an accurate focusing can be realized.

A still image pick-up device according to the present invention comprises a photoelectric converter on which image pick-up light from a subject is incident to convert the image pick-up light into an electric signal and pick-up an image; a finder on which the image picked up by the photoelectric converter is displayed; an infrared removing filter provided so as to be inserted into or retracted from an optical path of the image pick-up light to remove the infrared components of the image pick-up light; an infrared light emitting part for applying infrared rays to the subject; an auxiliary light applying part for applying visible lights to the subject; a recording part for recording a still image picked up by the photoelectric converter; and a main control part for respectively controlling the parts in accordance with the switching operation of processes including a framing process for displaying the image of the subject which is to be picked up on the finder; a focusing process for detecting the focusing position of a focus lens based on the pick-up image picked up by the photoelectric converter and a still image pick-up process for picking up and recording the still image. The main control part controls the infrared removing optical filter to be retracted outside the optical path and infrared rays to be emitted from the infrared light emitting part upon framing process; the emission of infrared rays from the infrared light emitting part to be stopped and the visible lights to be emitted from the auxiliary light applying part upon focusing process; and the infrared removing optical filter to be inserted into the optical path and the focus lens to be moved to the focusing position detected during the focusing process to pick up the still image in the still image pick-up process.

In the still image pick-up device according to the present invention, the framing process is carried out by the infrared picked-up image and a visible light photographing is carried out by using a flash or a low speed shutter in still image pick-up process. In automatic focusing, the emission of the infrared rays is stopped to apply auxiliary visible lights to the subject.

A still image pick-up method according to the present invention is a still image pick-up method for electronically picking up a still image by using a photoelectric converter. This method comprises the steps of: switching, in accordance with the selecting operation of a user or an automatic selection, processes including a framing process for displaying the image of a subject which is to be picked up on a finder; a focusing process for detecting the focusing position of a focus lens based on the pick-up image picked up by the photoelectric converter and a still image pick-up process for picking up and recording a still image; retracting an infrared removing optical filter for removing the infrared components of image pick-up light-outside an optical path and applying infrared rays to the subject in the framing process; stopping the emission of infrared rays and applying auxiliary visible lights to the subject in the focusing process; and inserting the infrared removing optical filter onto the optical path and moving the focus lens to the focusing position detected during the focusing process to pick up the still image in the still image pick-up process.

In the still image pick-up method according to the present invention, the framing process is carried out by the infrared picked-up image and a visible light photographing is carried out by using a flash or a low speed shutter in still image pick-up process. In automatic focusing, the emission of the infrared rays is stopped to apply auxiliary visible lights to the subject.

Still another object and specific advantages obtained by the present invention will be more apparent from the description of an embodiment by referring to the drawings.

BEST MODE FOR CARRYING OUT THE INVENTION

Now, an example in which the present invention is applied to a digital still camera for electronically picking up a still image will be described.

Figure 2:
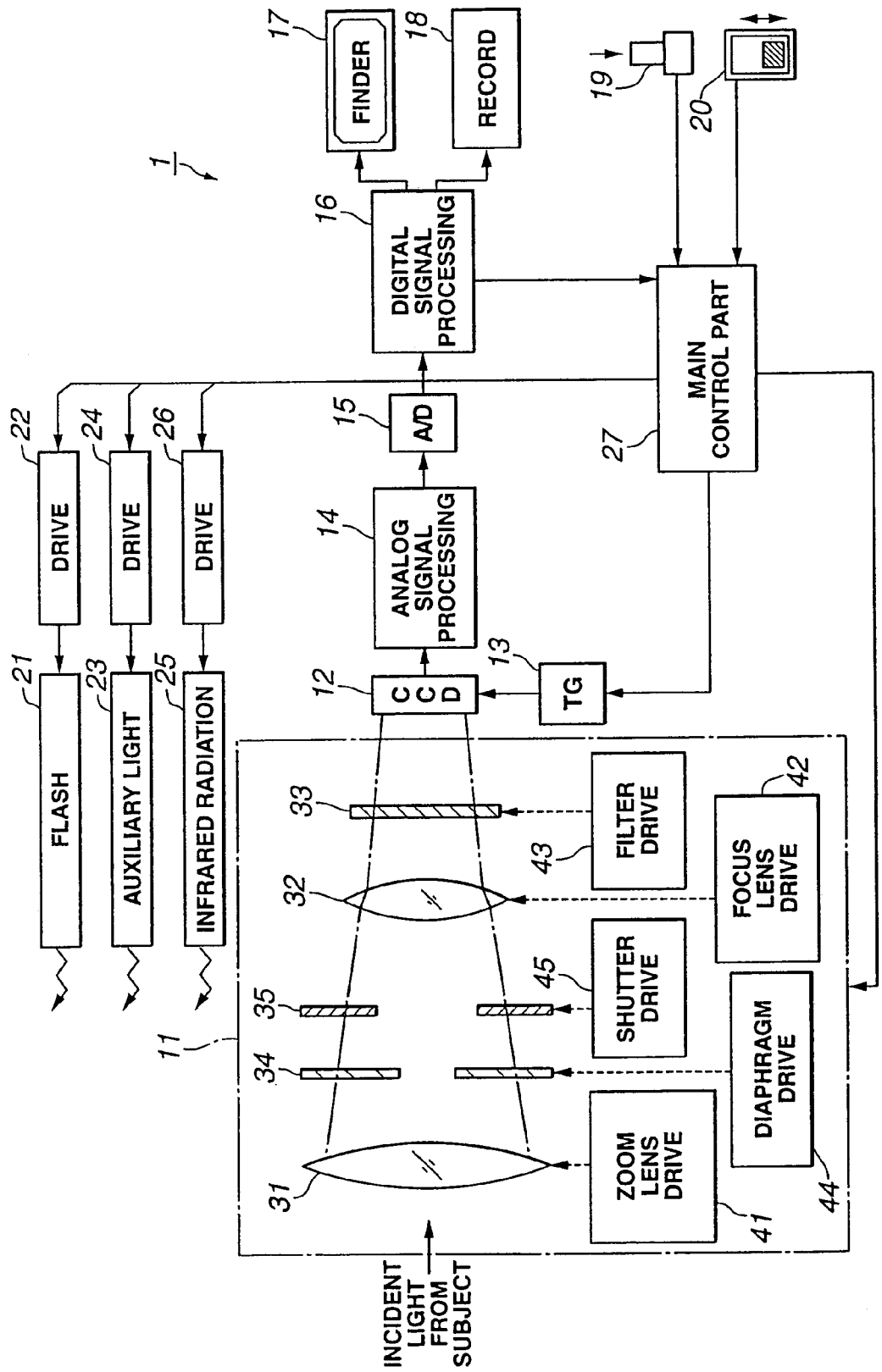
FIG. 2 is a block diagram of a digital still camera to which the present invention is applied.

A digital still camera 1 to which the present invention is applied has such a structure as shown in FIG. 2.

The digital still camera 1 to which the present invention is applied comprises, as shown in FIG. 2, a lens part 11, a CCD 12, a timing signal generating circuit (TG) 13, an analog signal processing circuit 14, an analog/digital converting circuit (A/D) 15, a digital signal processing circuit 16, a finder 17, a recording circuit 18, a shutter release button 19, a mode changing switch 20, a flash light emitting part 21, a flash driving circuit 22, an AF auxiliary light emitting part 23, an AF auxiliary light driving circuit 24, an infrared light emitting part 25, an infrared driving circuit 26 and a main control part 27.

The CCD 12 converts the image pick-up light of the image of a subject which is formed on a light receiving surface through the lens part 11 into an electric signal for each pixel and outputs an image signal for one screen. The image signal outputted by the CCD 12 is supplied to the analog signal processing circuit 14.

The timing signal generating circuit 13 generates various kinds of driving pulses required when the CCD 12 stores and reads the image signal for one screen. The variety of pulses generated from the timing signal generating circuit 113 are supplied to the CCD 12 and used as timing signals for the image pick-up process or the output process of the image signal.

The analog signal processing circuit 14 carries out analog processes such as a sampling process or an amplifying process to the image signal supplied from the CCD 12. The image signal outputted from the analog signal processing circuit 14 is supplied to the analog/digital converting circuit 15.

The analog/digital converting circuit 15 samples the analog image signal supplied from the analog signal processing circuit 14 at a prescribed sampling rate to convert the analog image signal into a digital image signal. The digital image signal outputted from the analog/digital converting circuit 15 is supplied to the digital signal processing circuit 16.

The digital signal processing circuit 16 generates various kinds of signals necessary for framing, picking up a still image, automatic focusing, photometry, etc. from the digital image signal supplied from the analog/digital converting circuit 15. That is, the digital signal processing circuit 16 generates a display image signal from an input image signal, for instance, in framing process, and supplies the display image signal to the finder 17. The digital signal processing circuit 16 generates a still image signal of one frame from the input image signal, upon picking up a still image, compresses the still image signal, and then, supplies the compressed still image signal to the recording circuit 18. Further, the digital signal processing circuit 16 detects the high frequency components of a prescribed area in a screen from the input image signal upon automatic focusing, generates parameters showing the high frequency components and supplies the parameters to the main control part 27. Further, the digital signal processing circuit 16 detects light quantity components of the prescribed area in the screen from the input image signal upon photometry process, generates parameters showing the light quantity levels thereof and supplies the parameters to the main control part 27.

The finder 17 is an electronic type display device composed of, for instance, a liquid crystal panel. To the finder 17, the display image signal is inputted from the digital signal processing circuit 16, in framing process, and the image signal is displayed. That is, on the finder 17, the image of the subject which is formed on the light receiving surface of the CCD 12 is displayed during a time except at the time of picking up a still image.

The recording circuit 18 records a still image signal outputted from the digital signal processing circuit 16 on recording media such as memory card upon picking up a still image.

The shutter release button 19 is a momentary pressing switch operated by a user. The shutter release button 19 has a function for discriminating and switching three states including a state (off) that the switch is not pressed, a state (completely pressed) that the switch is completely pressed and a state (half pressed) that the switch is half pressed. The three pressed states (off, half-pressed, completely pressed) of the shutter release button 19 are discriminated by the main control part 27. The operation of the digital still camera 1 under each pressed state will be described below in detail.

The mode changing switch 20 is a change switch operated by the user. The mode changing switch 20 is a switch for switching the photographing mode of the digital still camera 1 to an ordinary photographing mode and a low illuminance photographing mode. The switching state of the mode change switch 20 is discriminated by the main control part 27. The operation of the digital still camera 1 under each mode will be described below in detail.

The flash light emitting part 21 is discharging means such as xenon lamp called a so-called strobe or speed light which can momentarily emit a strong light to apply the light to a subject. In other words, the flash light emitting part 21 can apply a strong flash to the subject. The flash light emitting part 21 is attached to, for instance, the front surface or the upper part of a casing so as to apply light to a subject whose image is to be picked up. That is, the flash light emitting part 21 is provided to apply light in the direction of an optical axis of a lens forward from the lens. The flash light emitting part 21 is driven by the flash driving circuit 22 and its light emitting timing is controlled by the main control part 27.

The AF auxiliary light emitting part 23 is visible light emitting means for emitting visible lights such as a light emitting diode, a laser light emitting part, a lamp, etc. The AF auxiliary light emitting part 23 is different from the flash light emitting part 21 and does not momentarily emit light, but continuously emits a substantially prescribed quantity of visible lights. This AF auxiliary light emitting part 23 is also attached to, for instance, the front surface or the upper part of a casing so as to emit light to a subject whose image is to be picked up. That is, the AF auxiliary light emitting part 23 is provided to apply light in the direction of an optical axis of the lens forward from the lens. The AF auxiliary light emitting part 23 is driven by the AF auxiliary light driving circuit 24 and its light emitting timing is controlled by the main control part 27.

The infrared light emitting part 25 is light emitting means for infrared rays. The infrared light emitting part 25 is likewise different from the flash light emitting part 21 and does not momentarily emit light, but continuously emits a substantially prescribed quantity of infrared rays. The infrared light emitting part 25 is also attached to, for instance, the front surface or the upper part of a casing so as to emit light to a subject whose image is to be picked up. That is, the infrared light emitting part 25 is provided to apply light in the direction of an optical axis of the lens forward from the lens. The infrared light emitting part 25 is driven by the infrared driving circuit 26 and its light emitting timing is controlled by the main control part 27.

The main control part 27 controls the respective parts of the digital still camera 1.

The lens part 11 includes a zoom lens 31, a focusing lens 32, an infrared cut filter 33, diaphragm blades 34 and shutter blades 35. These members form an optical system for forming an image of the image pick-up light from the subject on the light receive surface of the CCD 12. Further, the lens part 11 includes a zoom lens driving part 41 for driving the zoom lens 31, a focusing lens driving part 42 for driving the focusing lens 32, a filter driving circuit 43 for driving the infrared cut filter 33, a diaphragm driving part 44 for driving the diaphragm blades 34 and a shutter driving part 45 for driving the shutter blades 35.

The zoom lens 31 is provided at a position where its optical axis corresponds to a vertical line extended from a substantially central part of the light receive surface of the CCD 12. The zoom lens 31 is provided so as to be linearly movable forward and backward on the optical axis. The image pick-up magnification of an image formed on the light receiving surface of the CCD 12 is changed in accordance with the moving position of the zoom lens 31. The moving position of the zoom lens 31 is controlled by the main control part 27 through the zoom lens driving part 41.

The focusing lens 32 is provided at a position where its optical axis corresponds to a vertical line extended from a substantially central part of the light receive surface of the CCD 12. The focusing lens 32 is provided so as to be linearly movable forward and backward on the optical axis. The focusing position of an image formed on the light receiving surface of the CCD 12 is changed in accordance with the moving position of the focusing lens 32. The moving position of the focusing lens 32 is controlled by the main control part 27 through the focusing lens driving part 42.

Figure 1:
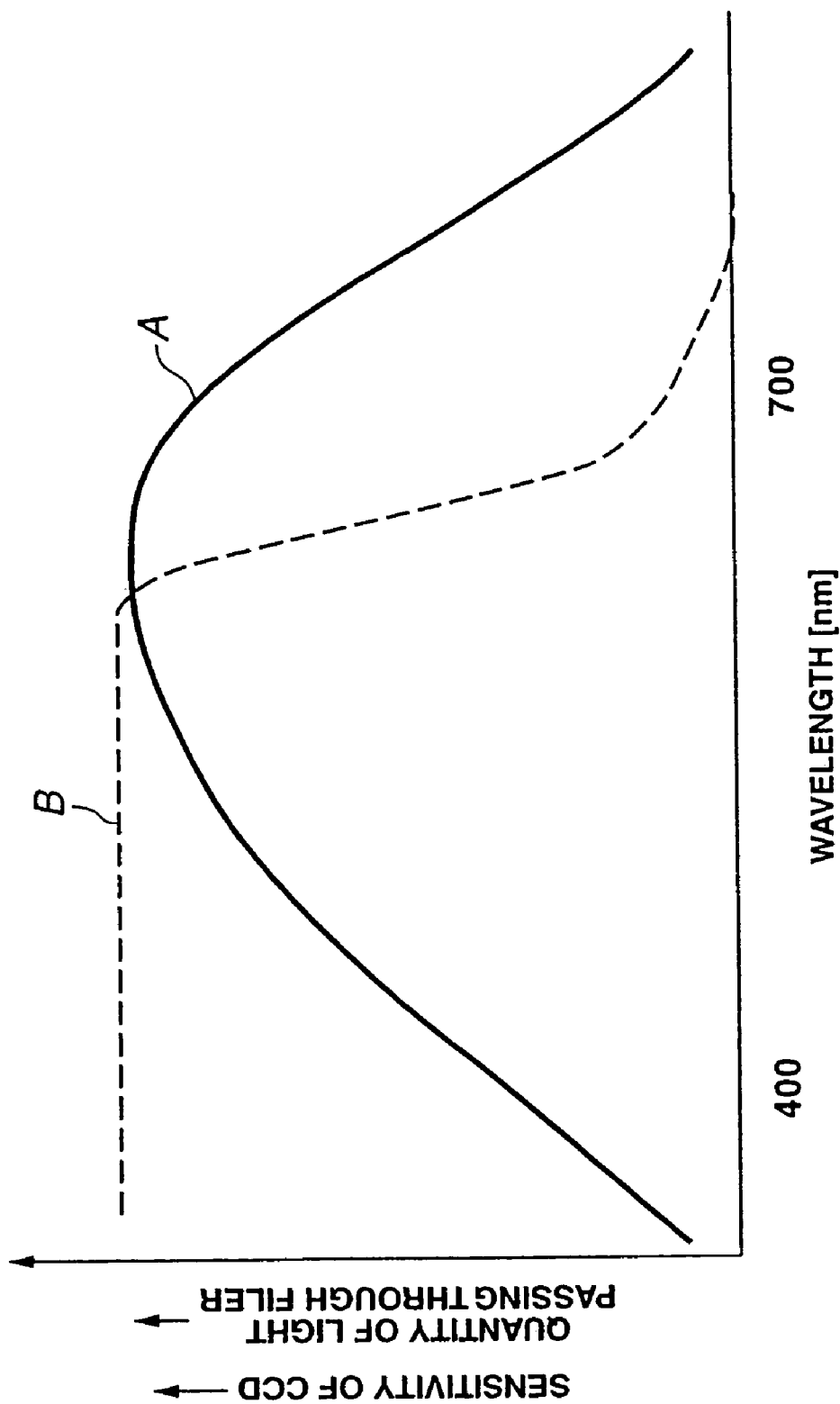
FIG. 1 is a diagram showing wavelength-sensitivity characteristics of a CCD and an infrared cut filter.

The infrared cut filter 33 is provided so as to be selectively switched to be retracted from or inserted into the optical path of image pick-up light whose image is formed on the light receiving surface of the CCD 12. Here, the insertion of the infrared cut filter 33 into the optical path means that the infrared cut filter 33 is arranged at a position where the image pick-up light whose image is formed on the image receiving surface of the CCD 12 passes. Further, the retraction of the infrared cut filter from the optical path of the image pick-up light means that the infrared cut filter 33 is arranged at a position where the image pick-up light whose image is formed on the light receiving surface of the CCD 12 does not pass. The infrared cut filter 33 is an optical filter for removing infrared rays from incident light and has optical characteristics of interrupting light of wavelength longer than about 700 nm as shown, for instance, in FIG. 1. Accordingly, when the infrared cut filter 33 is inserted into the optical path, the image of the image pick-up light from which the light of wavelength not shorter than infrared rays is removed is formed on the light receiving surface of the CCD 12. When the infrared cut filter 33 is retracted from the optical path of the image pick-up light, the image of the image pick-up light from which the infrared rays are not removed is directly formed on the light receiving surface of the CCD 12. The infrared cut filter 33 is controlled to be switched to be inserted or retracted by the main control part 27 through the filter driving part 43.

The diaphragm blades 34 adjust the quantity of the image pick-up light whose image is formed on the light receive surface of the CCD 12. The diaphragm blades 34 form an aperture on the optical axis of the optical system of the lens part 11 as a center and control the quantity of light by changing the aperture size. That is, the diaphragm blades 34 control a diaphragm value (F-number) of the camera. The diaphragm value of the diaphragm blades 34 is controlled by the main control part 27 through the diaphragm driving part 44.

The shutter blades 35 are provided on the optical path of the image pick-up light whose image is formed on the light receiving surface of the CCD 12 to interrupt the image pick-up light by opening or closing the blades. The shutter blades 35 open the image pick-up light for a prescribed time upon picking up a still image. At that time, the charge storage time (electronic shutter) of the CCD 12 is controlled and the applying time of light whose image is formed on the light receive surface is controlled. The shutter speed of the camera at the time of picking up the still image is controlled by the electronic shutter. The opening and closing timing of the shutter blades 35 is controlled by the main control part 27 through the shutter driving part 45.

Now, the operation of the digital still camera 1 according to the present invention will be described below.

The digital still camera 1 according to the present invention carries out a framing process, an automatic focusing process and a still image pick-up process in accordance with the states (off, half-pressed, completely pressed) of the shutter release button 19.

The framing process is a process that an image picked up by the CCD 12 is displayed on the finder 17 so that a user can recognize the position of a subject in a screen or the composition of the screen before the user photographs the subject. In the framing process, the CCD 12 performs an image pick-up process for one screen at intervals of prescribed time (for instance, at intervals of ⅟30 seconds) and the picked-up and obtained image signal is outputted. Consequently, the image displayed on the finder 17 is also updated at intervals of prescribed time (for instance, at intervals of ⅟30 seconds). Thus, the user can recognize the pick-up image displayed on the finer 17 as a moving image. This framing process is carried out when the digital still camera 1 itself is brought into a state in which a photographing operation can be done and the shutter release button 19 is in a state of off, in other words, the user does not press the shutter release button 19.

The automatic focusing process is a process for automatically setting the focus of the image of the subject as a subject of a still image to be picked up. That is, the automatic focusing process is a process for automatically adjusting a focal point. While the framing process is carried out, when the shutter release button 19 is half pressed, the digital still camera 1 starts the automatic focusing process of what is called a self-focus detecting system that the focusing position is detected based on the picked-up image. When the digital still camera 1 starts the automatic focusing process, the main control part 27 controls the focusing lens 32 to be sequentially moved and pick up the image of the subject. Then, the digital signal processing circuit 16 measures high frequency components in a part of a range (focus measuring area) in the screen from each picked up image and detects parameters showing the levels of the high frequency components included in the area. Then, the main control part 27 detects the moving position of the focusing lens 32 in which the parameters become the highest and sets the moving position as the focusing position.

In the digital still camera 1, for instance, the opening degree of the diaphragm blades 34 or the electronic shutter or the like is set as well as the automatic focusing process, that is, a quantity of exposure light necessary for setting the F-number or shutter speed is likewise measured (photometry). Further, other setting such as the setting of white balance necessary for photographing a still image is also carried out.

To complete the automatic focusing process, a prescribed time is needed. However, even when this process is completed, in case a user yet remains to half press the shutter release button 19, the automatic focusing process will be automatically shifted to the framing process.

The still image pick-up process is a process that the image of a subject is picked up for one screen and the image of the subject of one screen is recorded on a medium. In the digital still camera 1, when the shutter release button 19 is completely pressed after the automatic focusing process is finished, the moving position of the focusing lens 32, the opening degree of the diaphragm blades 34 and shutter time, etc. are set to values detected during the automatic focusing process to pickup a still image of one screen by the CCD 12. The picked up still image is compressed by the digital signal processing circuit 16 or the like, and then, stored in the media. When the still image pick-up process is completed, the process is shifted to the framing process again.

Further, in the digital still camera 1, the photographing mode is switched to the ordinary photographing mode and to the low illuminance photographing mode. In the digital still camera 1, the light emission of the flash light emitting part 21, the AF auxiliary light emitting part 23 and the infrared light emitting part 25 is controlled and the insertion/retraction of the infrared cut filter 33 are controlled in accordance with the switched state of the mode.

The ordinary photographing mode is a photographing mode under an environment that the subject has an adequate illuminance and a still image can be photographed without supplementing for the shortage of the quantity of light by, for instance, the flash. On the other hand, the low illuminance photographing mode is a photographing mode under an environment that an ordinary still image photographing cannot be carried out under the environment of low illuminance such as at night or a dark place. The main control part 27 decides to switch the ordinary photographing mode and the low illuminance photographing mode in accordance with the switching state of the mode changing switch 20 or the value of a quantity of light in an outer periphery.

Under the ordinary photographing mode, the emission of light of the flash light emitting part 21, the AF auxiliary light emitting part 23 and the infrared light emitting part 25 is stopped and the infrared cut filter 33 is inserted into the optical path of photographing light.

On the other hand, under the low illuminance photographing mode, a control is performed as described below during the respective processes including the framing process, the automatic focusing process and the still image pick-up process.

In the framing process, the emission of light of the flash light emitting part 21 and the AF auxiliary light emitting part 23 is stopped and the light of the infrared light emitting part 25 is emitted. Further, the infrared cut filter 33 is retracted from the optical path of image pick-up light. Accordingly, in framing process, infrared rays are applied to the subject and the image of reflected light is picked up by the CCD 12. Therefore, even under the state of insufficient illuminance such as at night, a picked up image necessary for recognizing the position of the subject or a composition can be displayed on the finder 17.

In the automatic focusing process, the emission of light of the flash light emitting part 21 and the infrared light emitting part 25 is stopped and the light of the AF auxiliary light emitting part 23 is emitted. Further, the infrared cut filter 33 is inserted into the optical path of the image pick-up light. Accordingly, visible lights are applied to the subject and an image of reflected lights therefrom is picked up by the CCD 12. Therefore, even under the state of insufficient illuminance such as at night, the focusing position when the subject is photographed under the visible lights can be precisely detected.

At the time of the still image pick-up process, the emission of light of the AF auxiliary light emitting part 23 and the infrared light emitting part 25 is stopped and the light of the flash light emitting part 21 is emitted. Further, the infrared cut filter 33 is inserted onto the optical path of the image pick-up light. Accordingly, an adequate quantity of light necessary for photographing a still image is applied to the subject and the shutter blades 35 are controlled at its light applying timing so that the CCD 12 can receive the visible lights. Therefore, even under the state of insufficient illuminance, for instance, at night, the image of the subject can be electronically picked up.

Although the infrared cut filter 33 is inserted onto the optical path of the image pick-up light at the time of the automatic focusing process, the infrared cut filter 33 may be kept retracted from the optical path. In this case, the CCD 12 may possibly receive infrared components so that the precise focusing position only by the visible lights may not be probably detected. However, when the moving position of the focusing lens 32 is set by correcting a prescribed amount from the focusing position detected in automatic focusing, a focused still image can be picked up.

Further, although the light of the flash light emitting part 21 is emitted to supplement for the shortage of the quantity of light in the still image pick-up process, the light of the flash light emitting part 21 may not be emitted. Instead thereof, shutter speed may be adequately lowered so as to supplement for the shortage of the quantity of light.

Now, an operation sequence of the digital still camera 1 will be described below.

Firstly, for initialization, it is assumed that the emission of light of the flash light emitting part 21, the AF auxiliary light emitting part 23 and the infrared light emitting part 25 is stopped and the infrared cut filter 33 is inserted onto the optical path of the image pick-up light. Then, the main control part 27 of the digital still camera 1 decides whether a photographing mode is set to an ordinary operating mode or to a low illuminance operating mode. The main control part 27 carries out a process from step S11 shown in FIG. 3 when the photographing mode is set to the ordinary operating mode. The main control part 27 carries out a process from step S31 shown in FIG. 4 when the photographing mode is set to the low illuminance operating mode.

Figure 3:
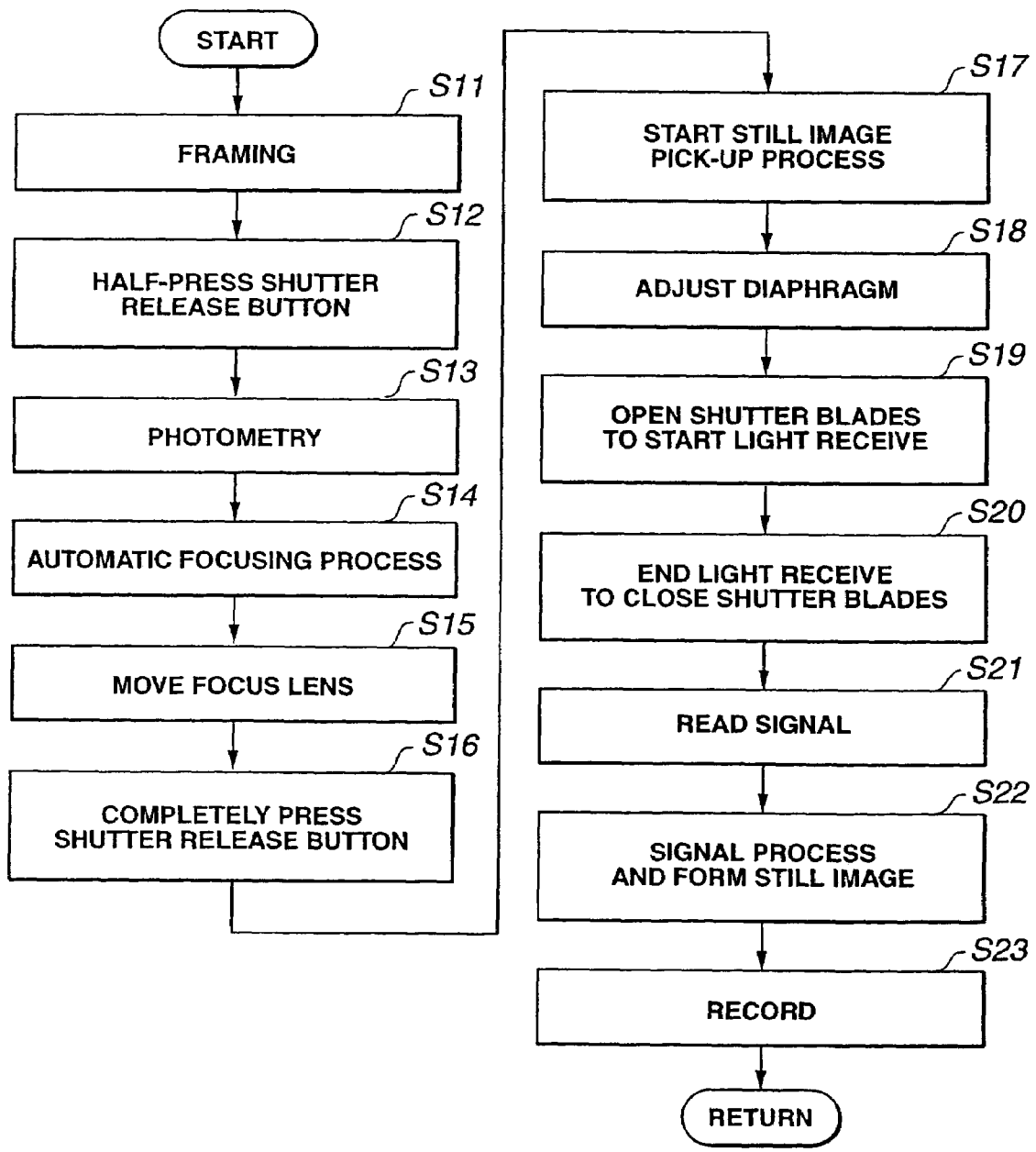
FIG. 3 is a flow chart showing an operation sequence in an ordinary operating mode.

Initially, the process in the ordinary operating mode will be described by referring to a flow chart shown in FIG. 3.

When the main control part 27 of the digital still camera 1 decides that the photographing mode is the ordinary operating mode, the main control part 27 starts a framing process (step S11).

Then, when the shutter release button 19 is half pressed by a user (step S12), the main control part 27 measures a quantity of exposure light (photometry) or the like (step S13). A photometry process is carried out to set a diaphragm value and shutter speed.

After that, the main control part 27 carries out an automatic focusing process (step S14). The automatic focusing process is carried out to set the focusing position of the focusing lens 32.

Subsequently, the main control part 27 moves the focusing lens 32 to the set lens position (step S15).

Then, when the shutter release button 19 is completely pressed by the user (step S16), the main control part 27 starts a still image pick-up process (step S17). When the main control part 27 starts the still image pick-up process, the main control part 27 firstly adjusts the opening degree of the diaphragm blades 34 to the diaphragm value set in the step S13 (step S18).

Then, the main control part 27 opens the shutter blades 35 to start a light receive of the CCD 12 (step S19).

When a charge storage time set in the step S13 arrives after the main control part 27 starts the light receive, the main control part 27 stops the light receive of the CCD 12 to close the shutter blades 35 (step S20).

After that, the main control part 27 starts reading of an image signal from the CCD 12 (step S21).

Subsequently, the main control part 27 carries out various kinds of processes to the image signal read from the CCD 12 to form a still image (step S22).

After that, the main control part 27 records the formed still image on a medium (step S23).

The still image pick-up process is completed in the step S23 and the process from the framing process (step S11) is repeated again.

Figure 4:
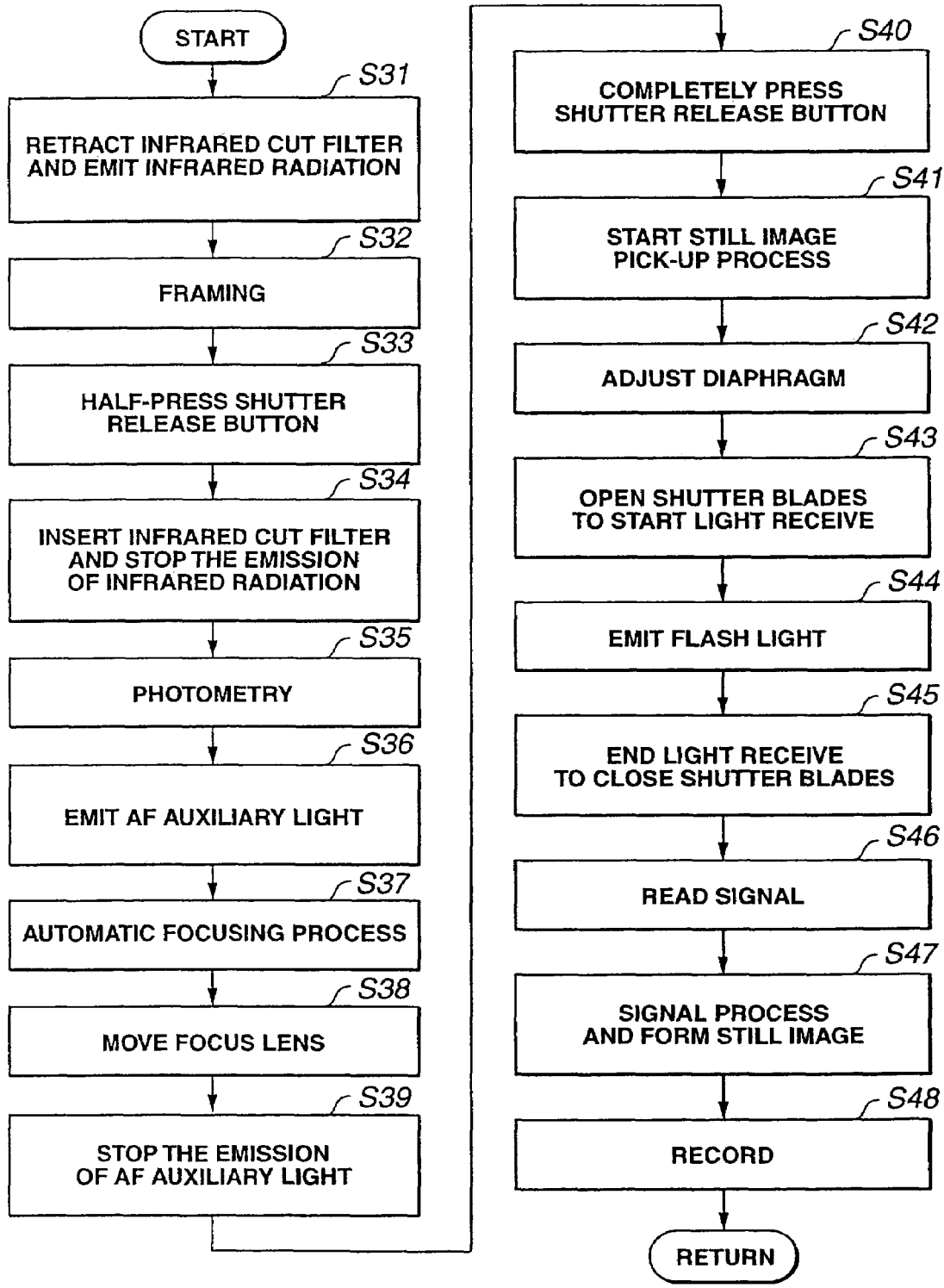
FIG. 4 is a flow chart showing an operation sequence in a low-illuminance operating mode.

Now, a process in the low illuminance operating mode will be described by referring to a flow chart shown in FIG. 4.

When the main control part 27 of the digital still camera 1 decides that the photographing mode is the low illuminance operating mode, the main control part 27 emits light of the infrared light emitting part 25 and retracts the infrared cut filter 33 from the optical path of the image pick-up light (step S31).

Then, the main control part 27 starts a framing process (step S32).

Then, when the shutter release button 19 is half-pressed by a user (step S33), the main control part 27 stops the emission of light of the infrared light emitting part 25 and inserts the infrared cut filter 33 onto the optical path of the image pick-up light (step S34).

Subsequently, the main control part 27 measures a quantity of exposure light (photometry) or the like (step S35). The photometry process is carried out to set the opening degree of a diaphragm and shutter speed.

Then, the main control part 27 emits light of the AF auxiliary light emitting part 23 (step S36).

After that, the main control part 27 carries out an automatic focusing process (step S37). The automatic focusing process is carried out to set the position of the focusing lens 32. Subsequently, the main control part 27 moves the focusing lens 32 to the set lens position (step S38).

After that, the main control part 27 stops the emission of light of the AF auxiliary light emitting part 23 (step S39).

Then, when the shutter release button 19 is completely pressed by a user (step S40), the main control part 27 starts a still image pick-up process (step S41).

When the main control part 27 starts the still image pick-up process, the main control part 27 firstly adjusts the opening degree of the diaphragm blades 34 to an diaphragm value set in the step S35 (step S42).

After that, the main control part 27 opens the shutter blades 35 to start the light receive of the CCD 12 (step S43).

Subsequently, the main control part 27 emits light of the flash light emitting part 21 simultaneously with a timing at which the main control part 27 opens the shutter blades 35 to start the light receive of the CCD 12 (step S44).

When a charge storage time set in the step S35 arrives after the main control part 27 starts the light receive, the main control part 27 stops the light receive of the CCD 12 to close the shutter blades 35 (step S45).

After that, the main control part 27 starts reading of an image signal from the CCD 12 (step S46).

Subsequently, the main control part 27 carries out various kinds of signal processes to the image signal read from the CCD 12 to form a still image (step S47).

Then, the main control part 27 records the formed still image on a medium (step S48).

The still image pick-up process is completed in the step S48 to repeat again the process from the framing process (step S31).

As mentioned above, in the digital still camera 1 according to the present invention, the infrared rays are applied to the subject to carry out the framing process. In the still image pick-up process, the visible light photographing is carried out by using a flash. Then, in the automatic focusing process, the emission of infrared rays is stopped and auxiliary visible lights are applied to the subject.

Consequently, the digital still camera 1 according to the present invention can realize the framing process that the image of the subject which is to be picked up is displayed on the finder even under the environment of low illuminance such as at night or a dark place to allow a user to recognize the contents of the photographed image. Further, even when the flash is applied to the subject after that, a precise focusing process without blooming can be realized.

INDUSTRIAL APPLICABILITY

In the still image pick-up device and the image pick-up method according to the present invention, the framing process is carried out under an infrared photographing. In the still image pick-up process, the flash or the low speed shutter or the like is used to perform the visible light photographing. In the automatic focusing process, the emission of infrared rays is stopped and the auxiliary visible lights are applied to the subject.

Thus, in the still image pick-up device and the still image pick-up method according to the present invention, the framing process can be realized that the image of the subject which is to be picked up is displayed on the finder even under the environment of low illuminance such as at night or a dark place to allow a user to recognize the contents of the photographed image. Further, even when the flash is applied to the subject after that, a precise focusing process without blooming can be realized.

The invention claimed is:

1. A still image pick-up device comprising:
   a photoelectric converter on which image pick-up light from a subject is incident to convert the image pick-up light into an electric signal and pick-up an image;
   a finder on which the image picked up by the photoelectric converter is displayed;
   an infrared removing filter provided so as to be inserted into or retracted from an optical path of the image pick-up light to remove infrared components of the image pick-up light;
   an infrared light emitting part for applying infrared rays to the subject;
   an auxiliary light applying part for applying visible lights to the subject;
   a recording part for recording a still image picked up by the photoelectric converter; and
   a main control part for controlling the parts in accordance with the switching operation of processes including a framing process for displaying the image of the subject which is to be picked up on the finder, a focusing process for detecting the focusing position of a focus lens based on the pick-up image picked up by the photoelectric converter and a still image pick-up process for picking up and recording a still image, wherein the main control part controls the infrared removing optical filter to be retracted outside the optical path and infrared rays to be emitted from the infrared light emitting part in the framing process, the emission of infrared rays from the infrared light emitting part to be stopped and the visible lights to be emitted from the auxiliary light applying part in the focusing process, and the infrared removing optical filter to be inserted into the optical path and the focus lens to be moved to the focusing position detected during the focusing process to pick up a still image in the still image pick-up process.

2. The still image pick-up device according to claim 1, further comprising a flash applying part for applying a flash of visible lights to the subject; wherein the main control part inserts the infrared removing optical filter into the optical path, moves the focus lens to the focusing position detected in the focusing process and applies the flash of visible lights from the flash applying part to the subject to pickup a still image in the still image pick-up process.

3. The still image pick-up device according to claim 1, wherein the main control part inserts the infrared removing optical filter into the optical path to detect the focusing position of the focus lens in the focusing process.

4. The still image pick-up device according to claim 1, wherein the main control part retracts the infrared removing optical filter outside the optical path to detect the focusing position of the focus lens in the focusing process, and moves the focus lens, in the still image pick-up process, to a position where a prescribed correction is applied to the focusing position detected at the time of the focusing process.

5. The still image pick-up device according to claim 1, further comprising a pressing button for switching the framing process, the focusing process and the still image pick-up process, wherein the main control part carries out the framing process when the pressing button is not pressed, performs the focusing process when the pressing button is half pressed, and performs the still image pick-up process when the pressing button is completely pressed, and further, carries out the framing process after the detection of the focusing position of the focus lens is completed while the pressing button is half pressed.

6. A still image pick-up method for electronically picking up a still image by using a photoelectric converter, the method comprising the steps of:
   switching, in accordance with the selecting operation of a user or an automatic selection, processes including a framing process for displaying the image of a subject which is to be picked up on a finder, a focusing process for detecting the focusing position of a focus lens based on the pick-up image picked up by the photoelectric converter and a still image pick-up process for picking up and recording a still image;
   retracting an infrared removing optical filter for removing infrared components of image pick-up light outside an optical path and applying infrared rays to the subject in the framing process;
   stopping the emission of infrared rays and applying auxiliary visible lights to the subject in the focusing process;

and inserting the infrared removing optical filter onto the optical path and moving the focus lens to the focusing position detected during the focusing process to pick up a still image in the still image pick-up process.

7. The still image pick-up method according to claim 6, wherein the infrared removing optical filter is inserted into the optical path and the focus lens is moved to the focusing position detected in the focusing process to apply a flash of visible lights to the subject and pick-up a still image in the still image pick-up process.

8. The still image pick-up method according to claim 6, wherein the infrared removing optical filter is inserted into the optical path to detect the focusing position of the focus lens in the focusing process.

9. The still image pick-up method according to claim 6, wherein the infrared removing optical filter is retracted outside the optical path to detect the focusing position of the focus lens in the focusing process, and the focus lens is moved to a position where a prescribed correction is applied to the focusing position detected during the focusing process in the still image pick-up process.

10. The still image pick-up method according to claim 6, wherein when a pressing button for switching the framing process, the focusing process and the still image pick-up process is not pressed, the framing process is carried out, when the pressing button is half pressed, the focusing process is carried out, and when the pressing button is completely pressed, the still image pick-up process is carried out, and further, after the detection of the focusing position of the focus lens is completed while the pressing button is half pressed, the framing process is carried out.

* * * * *